(12) United States Patent
Jost et al.

(10) Patent No.: US 11,034,389 B2
(45) Date of Patent: Jun. 15, 2021

(54) ROOF FRAME AND ROOF STRUCTURE OF A MOTOR VEHICLE

(71) Applicant: Dr. Ing. h.c. F. Porsche Aktiengesellschaft, Stuttgart (DE)

(72) Inventors: Patrick Jost, Ilsfeld (DE); Ines-Larissa Fels, Oberriexingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 101 days.

(21) Appl. No.: 16/537,672

(22) Filed: Aug. 12, 2019

(65) Prior Publication Data

US 2020/0047820 A1 Feb. 13, 2020

(30) Foreign Application Priority Data

Aug. 10, 2018 (DE) ...................... 10 2018 119 473.0

(51) Int. Cl.
| | | |
|---|---|---|
| *B62D 25/06* | (2006.01) | |
| *B62D 29/04* | (2006.01) | |
| *B62D 27/02* | (2006.01) | |

(52) U.S. Cl.
CPC ........... *B62D 29/043* (2013.01); *B62D 25/06* (2013.01); *B62D 27/026* (2013.01)

(58) Field of Classification Search
CPC ...... B62D 25/06; B62D 29/43; B62D 27/026; B62D 29/005; F16B 2001/0092;

(Continued)

(56) References Cited

U.S. PATENT DOCUMENTS 4,618,290 A * 10/1986 Hansen ............... E21D 21/0086
405/259.1
5,409,290 A 4/1995 Grimm et al.
(Continued)

FOREIGN PATENT DOCUMENTS

CN 106314547 A * 1/2017
DE 10 2005 035 807 4/2007
(Continued)

OTHER PUBLICATIONS

Kaspaizer, "CFRP-reinforced, partially transparent flat component, as well as a process for its production" published Jun. 23, 2016 by the German Patent Office. Figures 1-2, Paragraphs 30-34. (Year: 2016).*

(Continued)

*Primary Examiner* — Dennis H Pedder
*Assistant Examiner* — Joyce Eileen Hill
(74) *Attorney, Agent, or Firm* — Gerald E. Hespos; Michael J. Porco; Matthew T. Hespos

(57) ABSTRACT

A roof frame (1) for a roof structure (2) of a motor vehicle is closed in the circumferential direction and can be mounted on a body shell structure of the motor vehicle and connected to a roof outer shell (3). The roof frame (1) is produced from a fiber composite material. A side of the roof frame (1) that faces the body shell structure of the motor vehicle has height-adjustable installation domes (5) and spacer elements (6) are attached to each of the installation domes (5). The roof frame (1) and the roof outer shell (3) are connected to each other in an integrally bonded manner.

9 Claims, 2 Drawing Sheets

(58) Field of Classification Search
CPC ........ F16B 21/00; F16B 5/025; F16B 5/0233; F16B 5/00; B60R 13/0218; B60R 13/0212; B60R 13/0231; B60R 13/2021
USPC ........................................................ 296/210
See application file for complete search history.

(56) References Cited

U.S. PATENT DOCUMENTS

| | | | | |
|---|---|---|---|---|
| 6,402,171 | B1 * | 6/2002 | Nickerson | B60G 11/20 280/124.106 |
| 2011/0226312 | A1 * | 9/2011 | Bohm | B32B 7/12 136/251 |
| 2012/0248821 | A1 | 10/2012 | Schmied et al. | |
| 2015/0137563 | A1 | 5/2015 | Eberle et al. | |
| 2020/0191184 | A1 * | 6/2020 | Lamoureux | F16B 43/02 |

FOREIGN PATENT DOCUMENTS

| | | | |
|---|---|---|---|
| DE | 10 2014 003 969 | 9/2015 | |
| DE | 102014226529 A1 * | 6/2016 | ........... B32B 17/067 |
| DE | 10 2015 108 119 | 11/2016 | |
| FR | 2 932 764 | 12/2009 | |
| JP | 2002349542 A * | 12/2002 | |
| KR | 10-2008-0052745 | 6/2008 | |
| KR | 10-2019-0064873 | 6/2019 | |

OTHER PUBLICATIONS

Ding, "Composite material automobile top cover" published Jan. 11, 2017 by the European Patent Office Figures 1-4, Paragraphs 37-38. (Year: 2017).*

Sugita Masaji, "Hemispherical Surface Bearing", Dec. 4, 2002, Japanese Patent Office (Year: 2002).*

Great Britain Combined Search and Examination Report dated Jan. 10, 2020.

German Search Report dated Apr. 9, 2019.

* cited by examiner

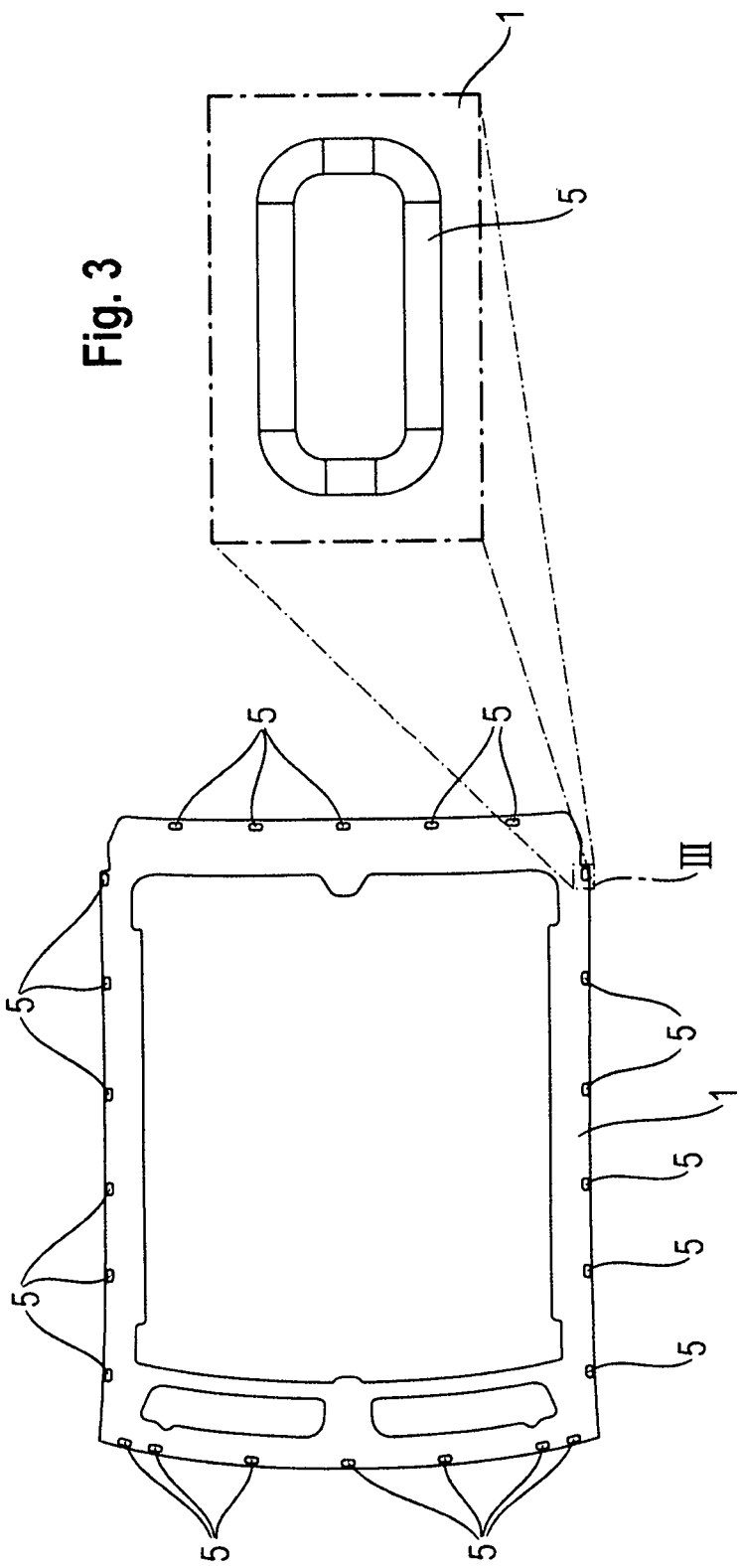

ROOF FRAME AND ROOF STRUCTURE OF A MOTOR VEHICLE

CROSS REFERENCE TO RELATED APPLICATION

This application claims priority under 35 USC 119 to German Patent Appl. No. 10 2018 119 473.0 filed on Aug. 10, 2018, the entire disclosure of which is incorporated herein by reference.

BACKGROUND

Field of the Invention

The invention relates to a roof frame for a roof structure of a motor vehicle. The roof frame is closed in the circumferential direction and can be mounted on a body shell structure of the motor vehicle and can be connected to a roof element. The invention also relates to a roof structure of a motor vehicle that includes a roof outer shell made of a fiber composite material.

Related Art

Roof structures for motor vehicles frequently have a roof outer shell that is made completely of steel sheet or another metallic material. Structural measures for reducing mass play an important role if a motor vehicle is intended to be configured to be sporty or fuel-efficient. Accordingly, lightweight materials, such as fiber composite materials, often are used in the construction of certain components of motor vehicles. Composite materials have high mechanical structural strength and therefore contribute to structural strength of the body. Composite materials also have a low mass and contribute to a reduction in the mass of the motor vehicle. Roof structures with a roof outer shell made of a fiber composite material, such as a carbon fiber reinforced plastic (CFRP), are known from the prior art.

The installation of a roof outer shell on a body shell structure of a motor vehicle can be simplified. Furthermore, the roof frame also contributes to mechanically stabilizing the roof structure.

U.S. Pat. No. 5,409,290 discloses a glass roof of a motor vehicle with a reinforcing element made of a glass fiber reinforced plastic. The glass roof lies against with the reinforcing element with the aid of domes formed on the reinforcing element. The glass roof is connected fixedly to the reinforcing element by insert molding.

Manufacturing tolerances of the body shell structure often lead to complicated reworking steps to mount the roof frame or the roof structure in the desired manner on the body shell structure with a precise fit.

An object of the invention is to provide a roof frame and a roof structure that compensates for manufacturing tolerances of the body shell structure in a simple manner so that installation of the roof frame or of the roof structure can be simplified.

SUMMARY

The invention relates to a roof frame produced from a fiber composite material. A lower side of the roof frame faces the body shell structure of the motor vehicle during the installation has height-adjustable installation domes with a spacer element attached to each of the installation domes. The height adjustability of the installation domes compensates for manufacturing tolerances of the body shell structure during the installation of the roof frame. During installation of the roof frame, it may become apparent that the position of one or more of the spacer elements with which the roof frame lies against the body shell structure is too high or too low. In this situation, the installation dome of the relevant spacer element can be made correspondingly thinner or thicker. This can be achieved, for example, by interchangeable inserts in the tool used for the production of the roof frame. Such interchangeable inserts can be revised or interchanged depending on the height actually required for the relevant installation dome.

The adjustable installation domes enable the same spacer elements to be attached to the entire roof frame. If the installation domes were not adjustable, spacer elements of differing heights would have to be attached to the individual positions, which leads to an increased susceptibility to error since the different spacer elements may be installed at wrong positions.

The roof frame may be produced from a glass fiber reinforced plastic. A glass fiber reinforced plastic (GFRP) is suitable because of its mechanical properties. The roof frame can be produced by resin transfer molding (RTM).

The installation domes may be produced from a plastic resin, in particular from a pure resin.

The spacer elements may be produced from an ethylene-propylene-diene rubber. The material ethylene-propylene-diene rubber is distinguished by high elasticity and by good chemical stability and has sealing properties.

The spacer elements may be bonded adhesively to the installation domes to simplify installation of the spacer elements and to provide a secure support of the spacer elements on the installation domes. The adhesive connection between one of the spacer elements and one of the installation domes can be produced by a double-sided adhesive tape. Thus, the spacer elements can be installed on the installation domes in a particularly simple manner.

The entire roof structure can be attached as a structural unit to a body shell structure of the motor vehicle in a simple manner during a final installation of the motor vehicle. Separate installation steps, such as, for example, preliminary installation of the roof frame on the body shell structure before the roof outer shell can be mounted, advantageously are not required. The peripherally closed configuration of the roof frame has a positive effect on the increase in the mechanical stability and structural strength of the roof structure. The height adjustability of the installation domes advantageously permits compensation for manufacturing tolerances of the body shell structure during installation of the roof structure.

The fiber composite material from which the roof outer shell is produced may be a carbon fiber reinforced plastic. A carbon fiber reinforced plastic (CFRP) is suitable because of its mechanical structural strength, to a particular degree for the production of the roof outer shell. The roof outer shell can be produced by resin transfer molding (RTM).

Some known body shell structures have a cutout into which a glass roof is inserted and through which ambient light can enter an interior of the motor vehicle. Such a glass roof can be either a fixed glass roof with one or more stationary glass elements that cannot be opened by a user, or a panorama roof in which at least one glass element that can be opened at least partially or raised by a user. Such glass roofs disadvantageously have a relatively large mass due to the mass of the glass or safety glass used in the glass roof. Structural measures for reducing the mass play an important role if a motor vehicle is to be sporty or fuel-efficient.

Therefore, in one embodiment of the invention, the roof structure may be designed to be fastened to a body shell structure of the motor vehicle. The body shell structure may be configured with a roof structure that uses a light weight variant of the known fixed glass roof. The lightweight variant of the fixed glass roof contributes to reducing the mass of the motor vehicle. In this connection, the roof structure may have an overall construction height that is selected to correspond to an overall construction height of the glass roof. Thus, the glass roof for which the body shell structure is configured simply can be replaced by the roof structure presented here. The roof frame contributes to a corresponding height compensation.

Regions of the roof structure in which the roof outer shell is not connected to the roof frame can have an air gap between the roof outer shell and the roof frame. Said air gaps contribute advantageously to achieving the required overall construction height of the roof structure, and have no adverse effect on the overall mass of the roof structure.

The roof outer shell may be bonded adhesively to the roof frame. The roof structure can have an adhesive structure with plural adhesive sections, in particular adhesive surfaces, by means of which the roof outer shell and the roof frame are connected to each other in an integrally bonded manner to achieve a secure adhesive bond of the roof outer shell with the roof frame. The adhesive structure can be produced by an adhesive based on polyurethane and can be formed by at least one adhesive bead. Thus, the production of the integrally bonded adhesive connection of the roof outer shell to the roof frame can take place in a particularly simple manner. The adhesive bead can be formed as one part or as multiple parts.

Further features and advantages of the invention will become clear on the basis of the description below of a preferred embodiment with reference to the attached figures.

BRIEF DESCRIPTION OF THE DRAWINGS

FIG. 2 is a bottom view of a roof frame of the roof structure according to FIG. 1.

FIG. 3 shows an enlarged illustration of a detail according to III in FIG. 2.

DETAILED DESCRIPTION

Figure 1:
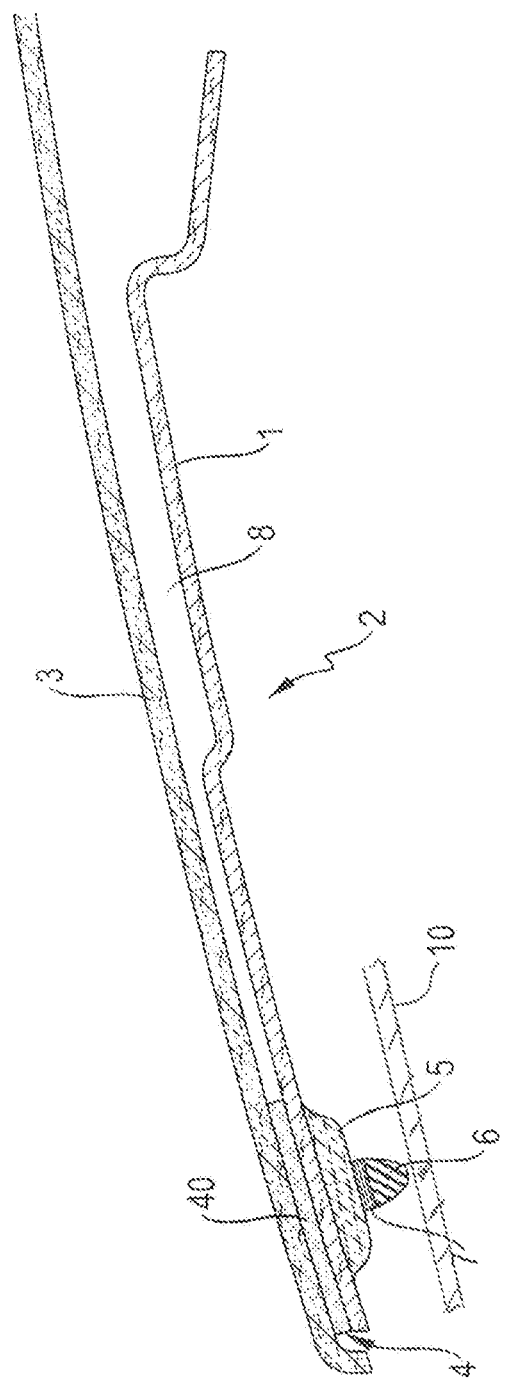
FIG. 1 is a sectional view of a roof structure for a motor vehicle according to an embodiment of the invention.

With reference to FIG. 1, a roof structure 2 for a motor vehicle according to an embodiment of the invention, has a roof outer shell 3 made of a fiber composite material. In the present case, the roof outer shell 3 is produced from a carbon fiber reinforced plastic (CFRP) and the outer side thereof, which forms a visible side of the roof outer shell 3, preferably has visible carbon optics to impart a visually high-quality appearance to the roof structure 2. The roof outer shell 3 can be produced by resin transfer molding (RTM) and has a relatively small material thickness which is typically less than 2 mm. This small material thickness of the roof outer shell 3 contributes to reducing the mass of the roof structure 2.

The roof structure 2 has a roof frame 1 formed in a peripherally closed manner from a fiber composite material. A bottom view of the roof frame 1 is illustrated in FIG. 2. The roof frame 1 preferably is produced from a glass fiber reinforced plastic (GFRP) to provide particularly high mechanical stability and strength. The roof frame 1 can be produced by resin transfer molding (RTM). The peripherally closed structure of the roof frame 1 also contributes to increased mechanical stability and structural strength of the roof structure 2. Advantageous mechanical aspects of the roof frame 1 also are achieved by the integral construction.

The roof outer shell 3 and the roof frame 1 are bonded adhesively to each other by a polyurethane-based adhesive during the production of the roof structure 2 to obtain an integrally bonded connection of the roof outer shell 2 to the roof frame 1. The adhesive structure 4 has plural adhesive surfaces 40, of which one is illustrated in FIG. 2. The adhesive structure 4 can be formed by one or more adhesive beads and therefore can be produced in a particularly simple manner. The adhesive surfaces 40 of the adhesive structure 4 between the roof outer shell 3 and the roof frame 1 are configured to meet crash requirements since the profile and the position of the adhesive surfaces 40 have an influence on the crash behavior of the roof structure 2.

The roof structure 2 can be designed to be mounted on a body shell structure 10 of a motor vehicle. The body shell structure is designed for fitting of a glass roof, in particular a fixed glass roof. A glass roof has a relatively large overall construction height due to the material thickness of the glass, in particular a safety glass. Such a glass roof has a large mass with a disadvantageous effect on the overall mass of the motor vehicle. In terms of lightweight aspects, it can therefore be advantageous to replace the glass roof by the roof structure 2 presented here.

The roof frame 1 is provided to compensate for the material thickness or height, with the compensation being necessitated by the smaller material thickness of the roof outer shell 3 made of carbon fiber reinforced plastic and permitting the installation of the roof structure 2 having the relatively flat roof outer shell 3 on the body shell structure 10 provided for the fitting of a glass roof. The peripherally closed configuration of the roof frame 1 contributes to increasing the mechanical stability and structural strength of the roof structure 2.

It becomes clear from FIG. 1 that, in those regions in which the roof outer shell 3 is not connected to the roof frame 1, the roof structure 2 in each case has an air gap 8 between the roof outer shell 3 and the roof frame 1. These air gaps 8 contribute advantageously to achieving the required overall construction height of the roof structure 2 without increasing the overall mass of the roof structure 2.

The peripheral roof frame 1 is produced from a glass fiber reinforced plastic to compensate for the smaller material thickness of the roof outer shell 3 from glass fiber reinforced plastic in comparison to a glass roof, in particular a fixed glass roof. The effective overall construction height of the roof structure 2 that is produced by the material thickness of the roof outer shell 3, the material thickness of the roof frame 1 and by the air gaps 8 formed between the roof outer shell 3 and the roof frame 1, is selected to correspond to the construction height of a glass roof, in particular a fixed glass roof, for which the body shell structure of the motor vehicle is configured.

The roof frame 1 has spacer elements 6 by means of which the roof frame 1 lies against the body shell structure 10 of the motor vehicle after installation, as shown in FIG. 1. At the installation positions of the spacer elements 6, a local material reinforcement (i.e. a local thickening) of the roof frame 1 is required since the distance from the roof outer shell 3 from above and the distance from the body shell structure from below are predetermined. This results in a required thickness of the roof frame 1 at said positions. This local thickening of the roof frame 1 is realized by installation domes 5.

As shown in FIG. 2, an underside of the roof frame 1 faces the body shell structure of the motor vehicle during installation and has installation domes 5 distributed in the circumferential direction. The installation domes 5 preferably are produced from a plastic resin, in particular a pure resin. One installation dome 5 is shown in FIG. 3. A spacer element 6 is attached to each of installation dome 5 and advantageously can be produced from an ethylene-propylene-diene rubber (EPDM). This material is distinguished by high elasticity and good chemical stability and also has advantageous sealing properties. The spacer elements 6 and the installation domes 5 assigned thereto are bonded adhesively to one another, and the adhesive connection can be realized by a double-sided adhesive tape 7.

The installation domes 5 are designed to be height-adjustable so that manufacturing tolerances of the body shell structure 10 during the installation of the roof structure 1 can be compensated for in a particularly simple manner by the height adjustment of the installation domes 5.

Should it turn out, during series installation of the roof structure 2, that the position of one or more of the spacer elements 6 is too high or too low, the installation dome 5 assigned to the relevant spacer element 6 can be designed to be correspondingly thinner or thicker. This can be achieved, for example, by corresponding interchangeable inserts in the tool that is used for producing the roof frame 1 and which, during the production of the roof frame 1 by resin transfer molding, is an RTM tool. The interchangeable inserts can be revised or completely interchanged depending on the height actually required for the relevant installation dome 5.

What is claimed is:

1. A roof frame for a roof structure of a motor vehicle, the roof frame being configured for mounting on a body shell structure of the motor vehicle and connected to a roof outer shell, the roof frame comprising: a circumferentially continuous frame element produced from a fiber composite material and having a lower side facing the body shell structure of the motor vehicle; installation domes mounted on the lower side of the frame element; and spacer elements attached respectively to the installation domes, wherein the installation domes are manufacturable to selected thicknesses for adjusting a height position of the roof frame relative to the body shell structure.

2. The roof frame of claim 1, wherein the roof frame is produced from a glass fiber reinforced plastic.

3. The roof frame of claim 2, wherein the installation domes are produced from a plastic resin.

4. The roof frame of claim 3, wherein the spacer elements are produced from an ethylene-propylene-diene rubber.

5. The roof frame of claim 1, wherein the spacer elements are bonded adhesively to the installation domes.

6. A roof structure of a motor vehicle, comprising the roof frame of claim 1 and a roof outer shell made of a fiber composite material, the roof frame being connected to the roof outer shell in an integrally bonded manner.

7. The roof structure of claim 6, wherein the fiber composite material is a carbon fiber reinforced plastic.

8. The roof structure of claim 7, wherein the roof structure is configured to be fastened to a body shell structure of the motor vehicle, the body shell structure being configured for fitting a glass roof.

9. The roof structure of claim 7, further comprising air gaps in regions of the roof structure between the roof outer shell and the roof frame where the roof outer shell is not connected to the roof frame.

* * * * *